(12) United States Patent
Varenhorst et al.

(10) Patent No.: US 10,015,217 B2
(45) Date of Patent: Jul. 3, 2018

(54) SYSTEM AND METHOD FOR GROUP PARTICIPATION IN A DIGITAL MEDIA PRESENTATION

(71) Applicant: Dropbox, Inc., San Francisco, CA (US)

(72) Inventors: Chris Varenhorst, San Francisco, CA (US); Daniel Kluesing, Menlo Park, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 15/166,731

(22) Filed: May 27, 2016

(65) Prior Publication Data

US 2016/0277459 A1    Sep. 22, 2016

Related U.S. Application Data

(63) Continuation of application No. 13/910,041, filed on Jun. 4, 2013, now Pat. No. 9,398,057.

(51) Int. Cl.
  *G06F 15/16*   (2006.01)
  *H04L 29/06*   (2006.01)
  *H04L 12/18*   (2006.01)
  *H04L 29/08*   (2006.01)

(52) U.S. Cl.
  CPC ............ *H04L 65/403* (2013.01); *H04L 12/18* (2013.01); *H04L 65/1069* (2013.01); *H04L 67/06* (2013.01)

(58) Field of Classification Search
  CPC ....... H04L 12/18; H04L 65/403; H04L 65/06; H04L 65/1069
  USPC ....................................................... 709/204
  See application file for complete search history.

(56) References Cited

U.S. PATENT DOCUMENTS

| 5,748,187 A * | 5/1998 | Kim .................. G06F 17/30017 |
| | | 375/E7.006 |
| 6,988,138 B1 * | 1/2006 | Alcorn ..................... G09B 7/02 |
| | | 434/350 |
| 7,260,600 B1 * | 8/2007 | Dunn ................ G06F 17/30902 |
| | | 707/E17.12 |
| 7,890,848 B2 * | 2/2011 | Bodin ............... G06F 17/30035 |
| | | 715/201 |

(Continued)

FOREIGN PATENT DOCUMENTS

WO     WO 2010/099551        2/2010

OTHER PUBLICATIONS

QR—Wikipedia, the free encyclopedia dated Apr. 30, 2013 (15 pages).

(Continued)

*Primary Examiner* — Kristie Shingles
(74) *Attorney, Agent, or Firm* — Hickman Palermo Becker Bingham LLP (57) ABSTRACT

System and method for group participation in a digital media presentation are provided that are capable of selecting digital media items for inclusion in the presentation from multiple participant's accounts thereby creating a group presentation in which digital media items of each participant are included in the presentation. Selections of digital media items for inclusion in the presentation can be made directly at the direction of the participations or inferentially according to a selection algorithm. Selections can be made during the presentation thereby allowing a participant to join the presentation after it has started and contribute digital media items to the presentation while it is running.

20 Claims, 6 Drawing Sheets

(56) References Cited

U.S. PATENT DOCUMENTS

| | | | |
|---|---|---|---|
| 8,423,891 B2* | 4/2013 | De Araujo | G06F 3/1454 |
| | | | 715/273 |
| 8,769,045 B1 | 7/2014 | Saviano | |
| 8,884,842 B2 | 11/2014 | Yoshizawa | |
| 8,949,352 B2* | 2/2015 | Lewis | G06F 17/30876 |
| | | | 709/206 |
| 9,026,912 B2 | 5/2015 | Grover | |
| 9,043,396 B2 | 5/2015 | Hammer | |
| 9,137,399 B2 | 9/2015 | Sato | |
| 2004/0001106 A1* | 1/2004 | Deutscher | G06F 17/30017 |
| | | | 715/838 |
| 2006/0010392 A1 | 1/2006 | Noel et al. | |
| 2007/0100882 A1 | 5/2007 | Hochwarth | |
| 2008/0154931 A1 | 6/2008 | Jacobs et al. | |
| 2008/0263103 A1* | 10/2008 | McGregor | G06F 17/30029 |
| 2008/0307324 A1 | 12/2008 | Westen | |
| 2009/0265632 A1* | 10/2009 | Russ | G06F 17/30056 |
| | | | 715/716 |
| 2009/0319884 A1 | 12/2009 | Amento | |
| 2010/0045567 A1 | 2/2010 | Lin | |
| 2010/0218099 A1 | 8/2010 | Van Melle | |
| 2010/0257456 A1* | 10/2010 | Lieb | G06Q 10/10 |
| | | | 715/741 |
| 2011/0138069 A1 | 6/2011 | Momchilov et al. | |
| 2012/0188382 A1 | 7/2012 | Morrison et al. | |
| 2012/0265803 A1 | 10/2012 | Ha et al. | |
| 2012/0297324 A1 | 11/2012 | Dollar | |
| 2013/0036135 A1 | 2/2013 | Brockey et al. | |
| 2013/0125009 A1 | 5/2013 | DeLuca et al. | |
| 2014/0321834 A1 | 10/2014 | Segal | |
| 2014/0351335 A1* | 11/2014 | Le Huerou | H04L 65/1069 |
| | | | 709/204 |
| 2015/0113458 A1 | 4/2015 | Mann | |
| 2016/0057184 A1 | 2/2016 | O'Brien et al. | |
| 2016/0283184 A1 | 9/2016 | Marshall et al. | |

OTHER PUBLICATIONS

International Searching Authority, "Search Report" in application No. PCT/US14/33865, dated Nov. 12, 2014, 8 pages.

Claims in application No. PCT/US 14/33865, dated Nov. 2014, 4 pages.

U.S. Appl. No. 14/076,107, filed Nov. 8, 2013, Office Action, dated Oct. 1, 2015.

U.S. Appl. No. 14/076,107, filed Nov. 8, 2013, Notice of Allowance, dated Mar. 29, 2016.

U.S. Appl. No. 14/076,107, filed Nov. 8, 2013, Interview Summary, dated Dec. 8, 2015.

U.S. Appl. No. 14/076,1047, filed Nov. 8, 2013, Office Action, dated Oct. 1, 2015.

U.S. Appl. No. 13/910,041, filed Jun. 4, 2013, Office Action, dated May 6, 2015.

U.S. Appl. No. 13/910,041, filed Jun. 4, 2013, Final Office Action, dated Nov. 4, 2015.

* cited by examiner

SYSTEM AND METHOD FOR GROUP PARTICIPATION IN A DIGITAL MEDIA PRESENTATION

BENEFIT CLAIM

This application claims the benefit under 35 U.S.C. § 120 as a continuation of application Ser. No. 13/910,041, filed Jun. 4, 2013, the entire contents of which is hereby incorporated by reference for all purposes as if fully set forth herein. The Applicant hereby rescinds any disclaimer of claim scope in the parent application or the prosecution history thereof and advises the USPTO that the claims in this application may be broader than any claim in the parent application.

BACKGROUND

This disclosure generally relates to digital media presentation applications, and more specifically, to group use of a network-based digital media presentation application by multiple participants.

Conventional digital media presentation applications may be used to present digital media. For example, a photo slideshow application may present a series of digital images on a video display, perhaps set or choreographed to music. Some presentation applications are used in a stand-alone environment, for example on a user's personal computer. Other presentation applications may be shared on a network with multiple users. Many digital media presentations created by conventional digital media presentation applications are fixed in that the digital media items included in the presentation must be selected before the presentation begins. Such applications do not allow new digital media items to be added to the presentation while it is running.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY OF THE DISCLOSURE

A digital media presentation application is disclosed herein that allows multiple users to participate in a digital media presentation. The presentation application is executed in a distributed networked computing environment and is capable of supporting group participation in the presentation in which each participant in the group can individually provide digital media content for the presentation using their personal computing devices. User participation in the presentation, including providing digital media content for the presentation, may occur after the presentation has started and while the presentation is running.

In one aspect, a method for group participation in a digital media presentation includes receiving a first network request from a personal computing device of a first user to participate in the digital media presentation. A second network request from a personal computing device of a second user to participate in the digital media presentation is also received. One or more digital media items associated with an account of the first user and one or more digital media items associated with an account of the second user are selected by the method for inclusion in the digital media presentation.

In another aspect, a system for group participation in a digital media presentation includes one or more servers communicatively coupled to a plurality of clients by one or more data networks. The plurality of clients includes a personal computing device of a first user and a personal computing device of a second user. The one or more servers include a presentation server module configured to receive a first network request from the personal computing device of the first user to participate in the digital media presentation. The presentation server module is further configured to receive a second network request from the personal computing device of the second user to participate in the digital media presentation. The presentation server module is also configured to select one or more digital media items associated with an account of the first user one or more digital media items associated with an account of the second user for inclusion in the digital media presentation.

BRIEF DESCRIPTION OF THE DRAWINGS

Further features of the present invention, its nature and various advantages, will be apparent upon consideration of the following detailed description, taken in conjunction with the accompanying drawings, in which like reference characters refer to like parts throughout, and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Aspects of the invention relate to a digital media presentation application which may be used in an online networked environment for group participation in a digital media presentation. The presentation may be made to the participants at a physically remote location from the presentation application. For example, the presentation may be made on a television in a participant's home and the presentation application may be hosted in an Internet-connected data center or other network-connected hosting facility located remotely from the participant's home. Participants may control the presentation from their personal computing devices by sending network requests to the presentation application. Such control can include joining an existing presentation and selecting digital media items for inclusion in the presentation. The presentation application coordinates the presentation including responding to participant's network requests, selecting digital media items for inclusion the presentation, and causing the selected digital media items to be presented. The presentation application can select digital media items for inclusion in the presentation directly at the direction of the participants or automatically according to an inferential selection algorithm. Participants may control the presentation after the presentation has started and while the presentation is running. In particular, a participant may join an already started presentation and add digital content items to the running presentation.

As used herein, the term "digital media presentation" or just "presentation" refers to any electronic presentation of digital media appropriate for the type of digital media, which can be varied. Typically, the type of digital media will be visual only (e.g., text, animation, video, images, graphics), aural only (e.g., music or speech), or both visual and aural (e.g., movies or other audiovisual programs, musical slideshows, or other combination of visual and aural digital media). An appropriate presentation for visual digital media could be, for example, displaying the visual digital media on a video display. An appropriate presentation for aural digital media could be, for example, outputting the aural digital media from a speaker. An appropriate presentation for visual and aural digital media could be displaying the visual portion of the digital media on a video display while simultaneously outputting the aural portion of the digital media from a speaker or speakers.

Although the following disclosure is discussed primarily in the context of group digital image slideshow presentation software, one of skill in the art will understand that the features and concepts described herein may be applied to other digital media types including, for example, digital video, digital audio, text documents, spreadsheet documents, slide deck presentation documents, and other digital media types.

Networked Computing Environment

Figure 1:
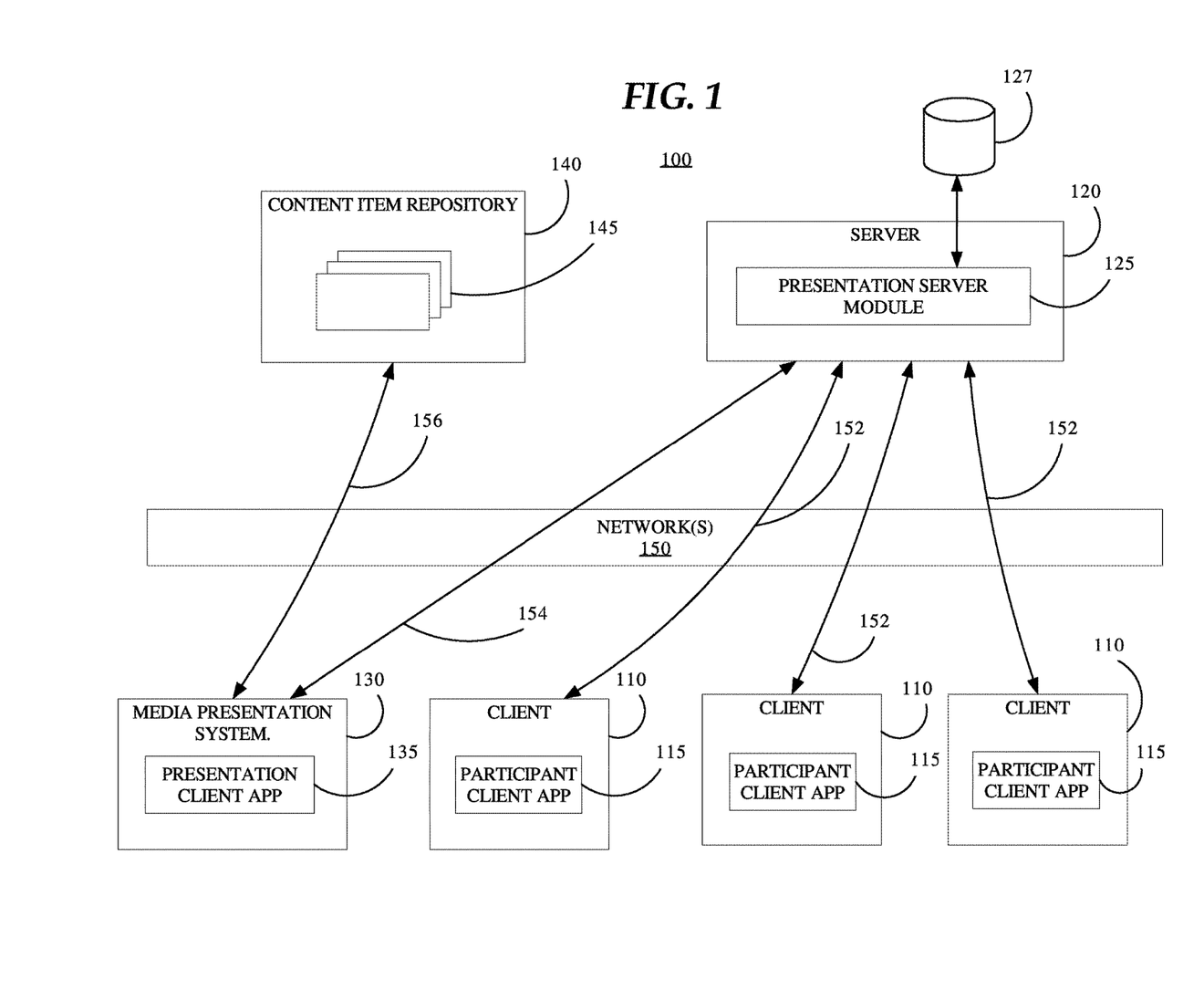
FIG. 1 is a diagram illustrating an example networked computing environment for implementing an embodiment of the invention.

FIG. 1 is a diagram illustrating an example networked computing environment 100 in which concepts consistent with the principles of the present invention may be implemented. Environment 100 includes multiple clients 110 that connect to servers 120, via network 150. Environment 100 also includes media presentation system 130 that connects to servers 120 and a content item repository 140, via network 150. Network 150 may be any network, such an intranet, the Internet, a local area network (LAN), a wide area network (WAN), a telephone network, a cellular network, a wireless network, or a combination of such networks. Although only one server 120 and three clients 110 are illustrated in FIG. 1, any number or combination of servers and clients suitable for the requirements of the implementation at hand may be used. Similarly, although only one content item repository 140 and one media presentation system 130 are illustrated in FIG. 1, any number or combination of content item repositories and media presentation systems suitable for the requirement of the implemented at hand may be used. Further, although single network 150 is shown in FIG. 1, multiple networks may be used.

In one exemplary embodiment, each of clients 110 and media presentation system 130 connect to the same wireless network such as an IEEE 801.11b/g/n wireless network. For example, the wireless network may be provided by a wireless hub or router in a home or office. The wireless network in turn is connected to the Internet by an Internet Service Provider (ISP) such as a cable operator or phone company. In the exemplary embodiment, the servers 120 and content item repository 140 are connected to the Internet by a data center or co-location provider in which the servers 102 and content item repository 140 are housed. Thus, in this exemplary embodiment, clients 110 communicate with servers 120 and media presentation system 130 communicates with servers 120 and content item repository 140 via the Internet. Network communication over network 150 may be made according to any number of network communication protocols depending on the requirements of the implementation at hand including, for example, the User Datagram Protocol (UDP), the Transmission Control Protocol/Internet Protocol (TCP/IP), the HyperText Transfer Protocol (HTTP), and the Secure HyperText Transfer Protocol (HTTPS).

Media presentation system 130 includes electronic components for presenting the digital media included in the presentation. For example, media presentation system 130 may include a video display and/or a speaker(s).

In addition, media presentation system 130 includes presentation client application 135. In one embodiment, presentation client application 135 is a software program such as JAVA program, for example, and media presentation system 130 includes general-purpose hardware and software computer components for executing the software program such as processor(s) (CPU(s)), memory, a hardware bus, and an operating system. While presentation client application 135 may be implemented in software, presentation client application 135 can instead be implemented in hardware or in a combination of hardware and software.

Media presentation system 130 may include an Application Programming Interface (API) or other interface enabling presentation client application 135 to present digital media at media presentation system 130. In some embodiments, media presentation system 130 is a smart television device (also referred to as a "connected television" or "hybrid television") or set-top device (e.g., a game console, BLU-RAY player, hotel television system, or other device) that integrates media presentation capabilities, data processing capabilities, and network connectivity capabilities. In these embodiments, presentation client application 135 may be developed according to a software development kit (SDK) and/or a native development kit (NDK) for developing third-party applications for a smart television, a set-top device, or other networked computing platform. In other embodiments, media presentation system 130 is a personal computing device such as a desktop computer, a workstation computer, or a laptop computer.

Participants use their personal computing devices 110 (referred to hereinafter as clients 110 or client devices 110) to participant in a group media presentation. As used herein, the term "participant" refers to a human user that participates in a group media presentation. In some embodiments, clients 110 are portable computing devices such as mobile phones, tablet computers, personal data assistants, laptop computers, or other mobile device. In other embodiments, clients 110 are stationary computing device such as desktop computers and workstation computers. Clients 110 can also include a mix of portable computing devices and stationary computing devices.

Participants use a participant client application 115 installed on their clients 110 to participate in a group presentation presented at media presentation system 130. Participant client application 115 may provide a graphical user interface or other user interface to facilitate such participation. In some embodiments, participant client application 115 is a mobile application developed for a particular mobile computing platform such as APPLE IOS, ANDROID, or BLACKBERRY OS. In other embodiments, participant client application 115 is a web browser such as INTERNET EXPLORER, FIREFOX, OPERA, CHROME, or SAFARI. Some or all of the instructions implementing participant client application 115 may be delivered by server 120 to clients 110 over network 150 for execution at clients 110. Such instructions may include, for example, HyperText Markup Language (HTML) instructions, Cascading Style Sheet (CSS) instructions, JAVASCRIPT, or other types of software instructions instructions. Different clients 110 may execute different forms of participant client application 115. For example, some clients 110 may execute a web browser-based form of participant client application 115 while other clients 110 may execute a mobile application-based form of participant client application 115.

Server 120 hosts presentation server module 125. Presentation server module 125 includes instructions or sets of instructions facilitating a group media presentation at media presentation system 130. Such facilitating may include receiving and responding to network request commands from clients 110 over network connections 152. Such facilitating may include receiving media presentation information from media presentation system 130 over network connection 154 and sending media presentation information to media presentation system 130 over network connection 154. Such facilitating may also include selecting digital media items for inclusion in a group media presentation at media presentation system 130 based on data stored in account database 127. Although presentation server module 125 is illustrated in FIG. 1 as being hosted on one server 120, presentation server module 125 can be distributed across multiple servers 120 according to the requirements of particular implement at hand.

Digital media items 145 presented as part of a group media presentation at media presentation system 130 may be stored in content item repository 140. Media presentation 130 may download digital media items 145 to be presented from content item repository 140 over network connection 156. In one embodiment, digital media items 145 may be downloaded from content item repository 140 at corresponding Uniform Resource Locators (URLs) in which each such URL uniquely identifies a digital media item 145 in content item repository 140. Presentation client application 135 on media presentation system 130 may receive URLs representing digital media items 145 selected for inclusion in a group media presentation from presentation server module 125 on server 120 over network connection 154.

Digital media items 145 stored in and downloaded from content item repository 140 can take a wide variety of different media formats. Such media formats may include, but are not limited to, digital image formats (e.g., TIFF, PNG, GIF, JPG, RAW, BMP, PSD, PSP, etc.), digital audio formats (e.g., MP3), digital video formats (e.g., MPEG-2, MPEG-4), transport stream formats (e.g., MPEG-TS), and digital documents formats (e.g., .DOC, .XLS, .PDF, .TXT).

Although illustrated separately in FIG. 1, server 120 and content item repository 140 may be controlled and operated by the same entity such as the same business, organization, or company. In other embodiments, however, server 120 is controlled and operated by a different entity than the entity that controls and operates content item repository 140. In both cases, account database 127 may store URLs or other digital media item location identifiers that refer to and identify digital media items 145 stored in content item repository 140. In scenarios where content item repository 140 and server 120 are controlled and operated by different entities, there may be a business agreement in place between the two entities allowing the entity that controls and operates server 120 to send URLs or other digital media item location identifiers to media presentation system 130 by which media presentation system 130 can download digital media items 145 from content item repository 140.

Account Database

As mentioned, presentation server module 125 selects digital media items 145 for inclusion in a group media presentation at media presentation system 130 based on data stored in account database 127. Such selection can be at the explicit direction of a participant. For example, the participant may use participant client application 115 to select particular digital media items 145 associated with the participant's account in account database 127 to include (or not include) in the group media presentation. Selection can also be inferential in which presentation server module 125 automatically and inferentially selects digital media items 145 for inclusion in the group presentation based on inferential selection metadata stored in account database 127. Inferential selection can be implemented to provide a "fire and forget" mode of operation. For example, presentation server module 125 can inferentially select digital image media items 145 (e.g., photos) associated with multiple participant's accounts to automatically create a group photo slideshow presented at media presentation system 130.

Figure 2:
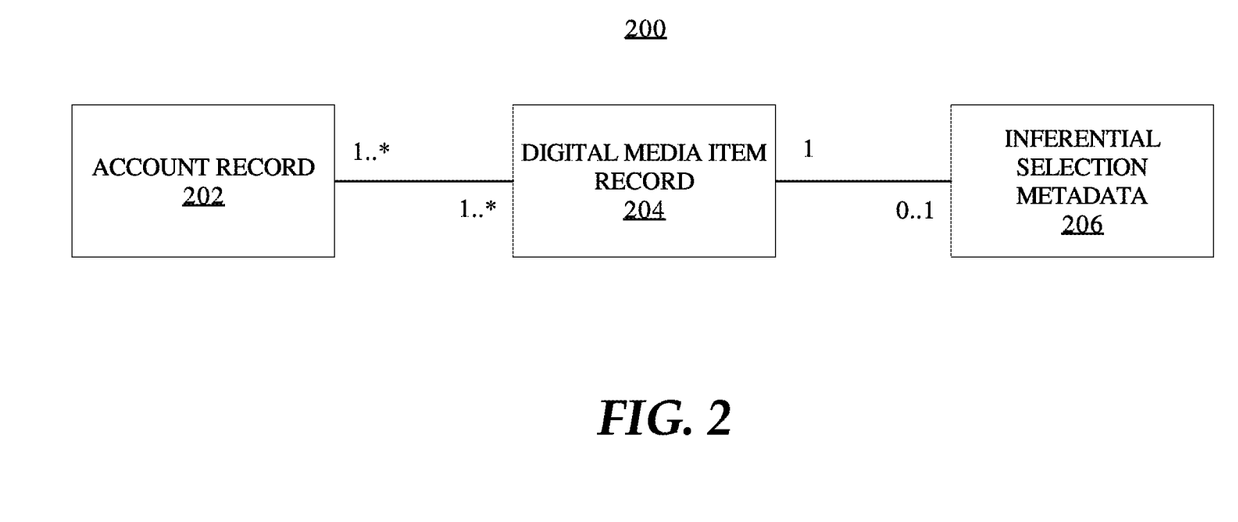
FIG. 2 is a data entity relationship diagram of data that may be stored in an account database according to an embodiment of the invention.

FIG. 2 is a data entity relationship diagram 200 illustrating relationships between data that may be stored in account database 127 according to an embodiment of the invention. Account record 202 represents an account of a participant. A participant may be associated with an account record 202 by a user authentication process which may be conducted by the presentation server module 125 or a third-party authentication service (not shown). For example, a participant may be associated with an account record 202 by providing a valid username and password combination to presentation server module 125 or a third-party authentication service. If a third-party authentication service, the authentication service may provide an authentication token to presentation server module 125 after successfully authenticating the participant and by which the presentation server module 125 can associate the participant with an account record 202. After being authenticated and associated with an account record 202, the authenticated participant interacts with presentation server module 125 in the context of the account record 202. In particular, a network request sent from client 110 to presentation server module 125 over network connection 152 is made in the context of a known identity of the participant making the request such that the presentation server module 125 can associate the request with an account record 202 of the participant.

An account record 202 may be associated with one or more digital media item records 204. A digital media item record 204 may correspond to a digital media item 145 stored in content item repository 140. A digital media item record 204 may contain location information identifying the location of the corresponding digital media item 145 in content item repository 140. The location information may be submitted by media presentation system 130 to content item repository 140 in a network request over network connection 156 for purposes of downloading the corresponding digital media item 145 to media presentation system 130. In some embodiments, the location information is a URL for the corresponding digital media item 145 which may be submitted to content item repository 140 in a network request. In other embodiments, the location information is information that may be included in a URL formulated by presentation server module 125 or presentation client application 135 and then submitted to content item repository 140 in a network request.

A digital media item record 204 may be associated with more than one account record 202. For example, a digital media item record 204 may be associated with multiple account records 202 if multiple users have shared access to or shared management of the corresponding digital media item 145. As another example, a digital media item record 204 may be associated with multiple account records 202 if multiples users are known to appear in or be related to the corresponding digital media item 145.

A digital media item record 204 may be associated with inferential selection metadata 206. Presentation server module 125 may process inferential selection metadata 206 associated with the digital media item records 204 associated with an account record 202 of a participant for purposes of inferentially selecting digital media items 145 to include in a group media presentation in which the participant is participating.

Inferential selection metadata 206 for a digital media item record 204 can include a wide variety of information on which inferential selection of the corresponding digital media item 145 can be based. In some embodiments, inferential selection metadata 206 includes any combination of access descriptors, privacy descriptors, and content descriptors.

Access descriptors are information that represents when, how often, and by whom the corresponding digital media item 145 has been accessed. "Access" in this context includes downloading the corresponding digital media item 145 (or a portion thereof) from content item repository 140 (e.g., to view in a web browser or store at a client device). The access descriptors may be generated based on network access logs or other historical access information collected based on network access to digital media items 145 at content item repository 140. The access descriptors can include the raw access log information such as data from access log entries or summaries of raw access log information. Some possible access descriptors that may be useful for making inferential selection decisions about the corresponding digital media item 145 for inclusion in a given group media presentation include, but are not limited to:
  the last time the corresponding digital media item 145 was accessed by any participant in the given group media presentation;
  the last time the corresponding digital media 145 was accessed by a particular participant in the given group media presentation;
  the number of times the corresponding digital media item 145 has been accessed by any participant in the given group media presentation; and
  the number of times the corresponding digital media item 145 has been access by a particular participant in the given group media presentation.

Privacy descriptors are information that represents any access control on the corresponding digital media item 145. Privacy descriptors may indicate who has access to the corresponding digital media item 145 and in particular which participants in a given group media presentation have access to the corresponding digital media item 145. Privacy descriptors may indicate general access categories for the corresponding digital media item 145 such as "public" or "private." Privacy descriptors may include specific access control information related to presentation in group media presentations generally. The specific access control information can represent group media presentation policies such as "do not include the corresponding digital media item 145 in any group media presentation" or "do not include the corresponding digital media item 145 in a group media presentation in which not all users associated with the corresponding digital media item 145 by their account records 202 are participants in the group media presentation".

Content descriptors are information that represents the content of the corresponding digital media item 145. Content descriptors can include a wide variety of different content information about the corresponding digital media item 145 including, but not limited to:
  Creator information—i.e., information specifying users or participants involved in creating the corresponding digital media item 145. For example, if the corresponding digital media item 145 embodies an original creative work, then the content descriptors may specify the participant or participants that created the work embodied in the corresponding digital media item 145. As another example, if the corresponding digital media item 145 is a photo, then the content descriptors may specify the participant that took the photo.
  Subject information—i.e., information specifying users or participants that are the subject of the digital media item 145. For example, the content descriptors may specify the participants that appear in a photo or a video or that speak or sing in an audio presentation.
  Geographical information—i.e., information specifying a geography or physical location. For example, for a digital photo, the content descriptors may specify where the photo was taken.
  Temporal information—i.e., information specifying dates and times related to the corresponding digital media item 145. For example, for a digital photo, the content descriptors may specify when the photo was taken.

Example Media Presentation System Process

Figure 3:
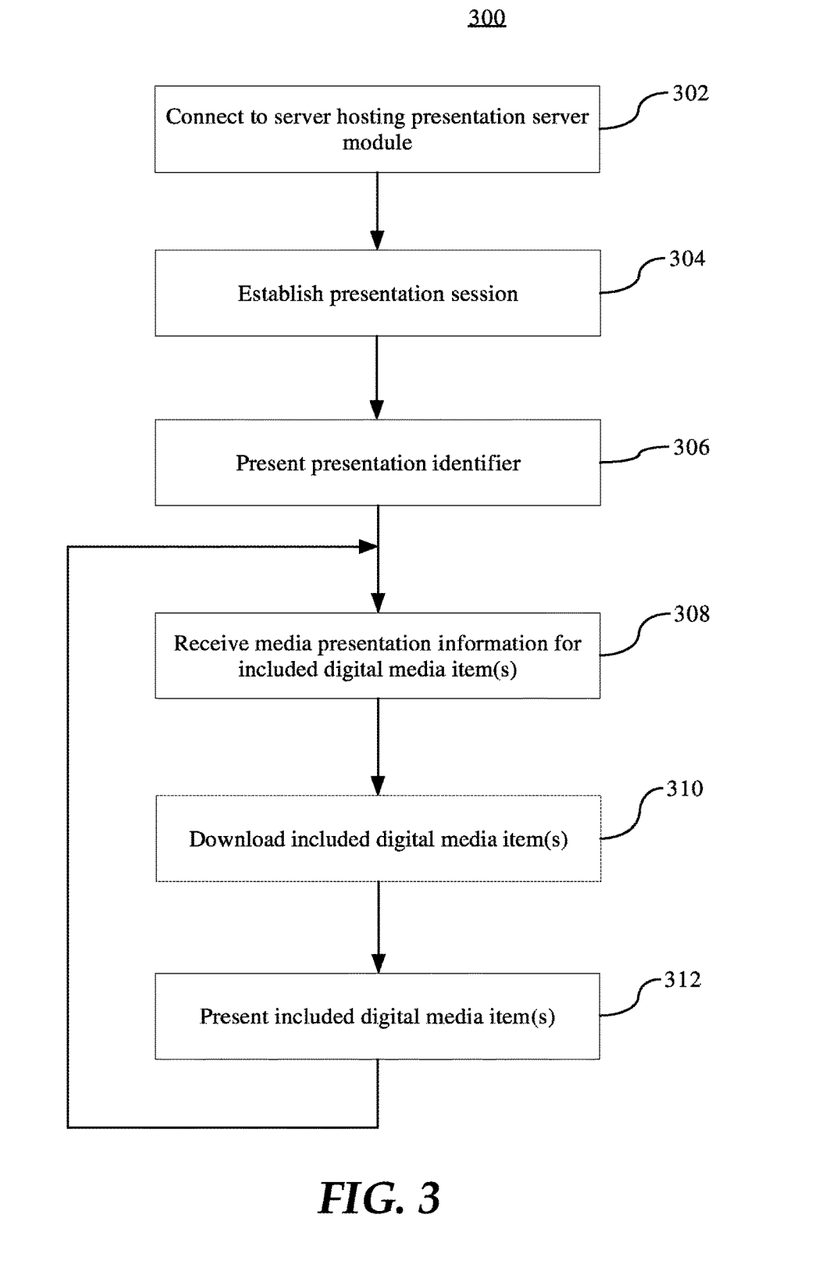
FIG. 3 is a flowchart of an exemplary process performed by a media presentation system for group participation in a digital media presentation according to an embodiment of the present invention.

FIG. 3 is a flowchart illustrating a process 300 for group participation in a media presentation performed by presentation client application 135 of media presentation system 130, according to an embodiment of the present invention. While the steps of process 300 are illustrated in FIG. 3 in a certain order, some steps are performed in a different order, some steps are performed concurrently, some steps are omitted, and/or some steps are combined in other embodiments.

Initially, at step 302, presentation client application 135 establishes network connection 154 with server 120. For example, presentation client application 135 may connect to server 120 according to the Transmission Control Protocol/Internet Protocol (TCP/IP). Network connection 154 may be long-lived, for example, for at least the duration of a presentation at media presentation system 130, which may span minutes, hours, days, or more. During the course of a presentation, network connection 154 may be used by presentation server module 125 to deliver information about digital media items 145 included in the presentation. Such information may include, among other things, download information for downloading digital media items 145 from content item repository 140 and presentation information such as, for example, how long to present included digital media items 145 and the order in which to present included digital media items 145. While in some embodiments network communication between presentation client application 135 and server 120 is accomplished using a connection-oriented networking protocol such as TCP/IP, network communication between presentation client application 135 and server 120 is accomplished using a connectionless networking protocol such as the User Datagram Protocol (UDP) in other embodiments.

At step 304, presentation client application 135 establishes a presentation session with presentation server module. Generally, a presentation session is information that may be used by presentation client application 135, presentation server module 125, and participant client application 115 to identify a particular active presentation. Presentation server module 125 may conduct multiple presentation sessions at the same time with multiple media presentation systems 130. To distinguish between multiple active presentations, each presentation may be associated with a unique presentation identifier (unique at least among the identifiers assigned to the multiple presentations being conducted). The presentation identifier may be a numeric or alphanumeric sequence, for example. Preferably, for security purposes, the presentation identifier should be difficult to guess. For example, the presentation identifier may be a truly randomly generated or pseudo-randomly generated alphanumeric sequence of a predetermined length. The presentation identifier can be assigned by presentation client application 135 and then sent to presentation server module 125 via connection 154. Alternatively, presentation server module 125 can assign the presentation identifier and send it to presentation client application 135 via connection 154.

Other information pertaining to capabilities and characteristics of media presentation system 130 may be communicated over connection 154 when establishing the presentation session. For example, such other information may include media presentation capabilities such as screen size, screen resolution, available media decoders, or any other information that indicates the type of digital media items that can be presented at media presentation system 130 or how digital media items can be presented at media presentation system 130.

At step 306, presentation client application 135 presents the presentation identifier at media presentation system 130. Such presentation is made so that a participant can obtain the presentation identifier and communicate it to presentation server module 125 using his or her client 110 for purposes of binding to and participating in the presentation session that the presentation identifier identifies.

In some embodiments, presentation of the presentation identifier is made visually so that participant can read the presentation identifier and input into his or her client device 110. For example, the sequence of characters that make up the presentation identifier can be displayed on a video display so that a participant can enter the sequence of characters into his client 110 using a keyboard or soft keypad.

In other embodiments, presentation of the presentation identifier is made visually so that it can be detected by participant client application 115 on client 110. For example, participant client application 115 can present the sequence of characters that make up the presentation identifier as a QR code, a matrix barcode, or other two-dimension bar code that can be detected as a 2-dimension digital image by an image sensor (e.g., a cell phone camera) of a client 110. The presentation client application 115 can process the captured digital image to determine the presentation identifier. Alternatively, the presentation client application 115 can send the captured digital image to presentation server module 125 for processing. For more information on QR codes generally refer to the web page at /wiki/QR_code in the Internet domain en.wikipedia.org, the entire contents of which is hereby incorporated by reference.

Steps 308, 310, and 312 may be performed by presentation client application 135 repeatedly. For example, steps 308, 310, and 312 may be performed in a loop. In addition or alternatively, two or more of steps 308, 310, and 312 may be performed concurrently with one another.

At step 308, presentation client application 135 receives media representation information from presentation server module 125. Media presentation information may include digital media identifying information and/or presentation control information.

Digital media identifying information includes information that identifies digital media items 145 in content item repository 140 that are included in the current presentation at media presentation system 130. Digital media identifying information for an included digital media item 145 may include information that can be submitted to content item repository 140 over network connection 156 for purposes of downloading the included digital media item 145 to media presentation system 130. For example, digital media identifying information for an included digital media item 145 may be a URL for the included digital media item 145 or a sequence of characters or sets of character sequences that can be included in a network request of content item repository 140 to identify the requested digital media item 145 to content item repository 140 for download.

Reference is made herein to "downloading" digital media items 145 from content item repository 140 to media presentation system 130. In this context, the term "downloading" or "download" includes both (a) receiving a digital media item 145 from content item repository 140 and storing the received digital media item 145 at media presentation system 130 for presentation after the entire digital media item 145 has been received and stored, and (b) receiving a digital item media item 145 from content item repository 140 and presenting the digital media item 145 as it is being received (also known as "streaming"). Streaming a digital media item 145 from content item repository 140 may include storing some or all of the digital media item 145 at media presentation system 130.

Presentation control information includes information that specifies how the included digital media items 145 are to be presented at media presentation system 130. Presentation control information may include such information as the order in which included digital media items 145 are to be presented (e.g., ordering information), how long included digital media items 145 are to be presented (e.g., presentation timing information), transition effects that presentation client application 115 is to apply and present for aesthetic transitioning between presentation of successive digital media items 145, and any other information used by presentation client application 135 for controlling the presentation of the included digital media items 145 at media presentation system 130. Transition effects include, but are not limited to, animated transition effects for visual digital media items 145 such as blinds transition (e.g., dividing presentation of the current digital media item into horizontally or vertically oriented strips and simultaneously revealing strips of the next digital media item), box transition (e.g., moving presentation of next digital media item into final display location with zoom effect), checkerboard transition (e.g., dividing presentation of the current digital media item into boxes and simultaneously revealing boxes of the next digital media item), dissolve transition (e.g., dividing presentation of current digital media item into dots that visually dissolve to reveal presentation of next digital media item), wipe transition (e.g., presentation of next digital media item is revealed in a vertical or horizontal direction), or other visual transition effect. If the successive digital media items 145 are audio-only, then the transition effects could include a fade-out/fade-in, a crossfade, or other audible transition effect.

It should be noted that presentation client application 135 can begin presenting included digital media items 145 before all digital media items 145 included in the presentation have been download from content item repository 140. In other words, step 312 may performed concurrently with step 310. For example, presentation client application 135 can present already downloaded digital media items 145 while it is downloading other digital media items 145. Similarly, presentation client application 135 can begin presenting included digital media items 145 before media presentation information for all digital media items 145 included in the presentation have been received from presentation server module 125. In other words, step 312 may be performed concurrently with step 308. For example, presentation client application 135 can present already downloaded digital media items 145 while it is receiving media presentation information for other digital media items 145 from presentation server module 125. Thus, presentation client application 135 is not required to receive media presentation information for all included digital media items 145 or required to download all included digital media items 145 before presentation client application 135 begins presenting included digital media items 145.

After receiving media presentation information for an included digital media item 145, the included digital media item 145 is downloaded from content item repository 140 at step 310. After the included digital media item 145 is download or while the included digital media item 145 is being downloaded (i.e., streamed), the included digital media item 145 is presented at step 312. Such presentation may be made in accordance with presentation control information received for the included digital media item 145 at step 308.

Example Client Device Process

Figure 4:
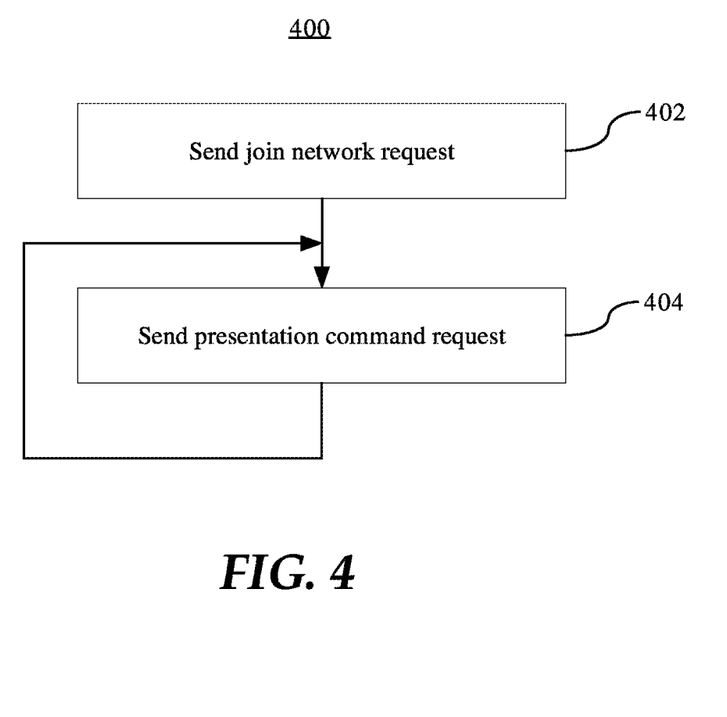
FIG. 4 is a flowchart of an exemplary process performed by a client device for group participant in a digital media presentation according to an embodiment of the present invention.

FIG. 4 is a flowchart illustrating a process 400 for group participation in a media presentation performed by participant client application 115 of client device 110, according to an embodiment of the present invention. While the steps of process 400 are illustrated in FIG. 4 in a certain order, some steps are performed in a different order, some steps are performed concurrently, some steps are omitted, and/or some steps are combined in other embodiments.

At step 402, participant client application 115 on a client 110 of a participant generates and sends a network request to join a presentation to presentation server module 125 over network connection 152. Multiple participants may each join a group media presentation by sending (step 402) a join network request from their respective client devices 110 to presentation server module 125. The join network request may be made in accordance with the HyperText Transfer Protocol (HTTP) of the Secure HyperText Transfer Protocol (HTTPS), for example. The join network request indicates the presentation identifier of the presentation the participant wishes to join and participate in. While in some embodiments network communication between participant client application 115 and server 120 is accomplished using a connection-oriented networking protocol such as TCP/IP, network communication between participant client application 115 and server 120 is accomplished using a connectionless networking protocol such as the User Datagram Protocol (UDP) in other embodiments.

Participant client application 115 may send the network request in response to the participant interacting with a user interface of participant client application 115 presented at the participant's client 110. For example, participant client application 115 may send the network response in response to the participant activating a "Join Presentation" or similarly labeled button or other user interface element. Such activation may be made by a mouse click or a touch-gesture, for example.

Alternatively, participant client application 115 may send the network request automatically in response to detecting conditions that indicate that the participant would like to participate in the presentation. For example, participant client application 115 may offer a "join when near" configuration setting which, when activated, will cause the participant client application 115 to attempt to automatically join a group media presentation when the participant's client device 110 is physically near a media presentation system 130 presenting the group media presentation. Detecting when the participant's client 110 is near the media presentation system 130 can be based on geographical or physical location information about the participant's client device 110 available to the participant client application 115. For example, nearness detection can be based on Global Positioning System (GPS) satellite information provided to participant client application 115 by a GPS module of the participant's client device 110.

In some embodiments, the participant's client device 110 is considered to be near the media presentation system 130 if the participant's client device 110 is near (e.g., within 100 feet) of another participant's client device 110 that has already joined the group media presentation. For this, both participants' client devices 110 may periodically send physical or geographical location information about the devices 110 to presentation server module 125 over network connections 152. By doing so, presentation server module 125 can detect when a client device 110 that has not yet joined a group media presentation is likely near the media presentation system 130 presenting the group media presentation by detecting when the client device 110 of the not-yet-joined participant is physically near the client device 110 of a participant who has joined the group media presentation. In response to detecting this, presentation server module 125 can send a notification or message to the client device 110 of the non-yet-joined participant containing information about the nearby group media presentation. Such information may include the presentation identifier among other information such as who has currently joined the presentation. Depending on configuration settings for the participant client application 115 on the client device 110 of the not-yet-joined participant, the participant client application 115 may automatically send a join network request to presentation server module 125 to join the group media presentation or do so after receiving confirmation to join the group media presentation from the not-yet-joined participant. Such confirmation may be provided through a user interface presented at the client device 110 of the not-yet-joined participant. For example, a pop-up notification, task bar message, or other notification or message may be displayed at the client device 110 of the not-yet-joined participant asking if he or she wants to join the group media presentation. In response to receiving confirmation, the participant client application 115 sends the join network request to presentation server module 125.

In addition to receiving the presentation identifier of a group media presentation from presentation server module 125, a participant client application 115 can obtain the presentation identifier of a group media presentation in other ways. Once obtained, the presentation client application 115 can send the join network request specifying the obtained presentation identifier. In some embodiments, the presentation identifier is provided to participant client application 115 by the participant. For example, the participant may read the presentation identifier as presented by media presentation system 130 and then provide the presentation identifier to participant client application 115 whereupon participant client application 115 sends the presentation identifier in a join network request to presentation server module 125. For example, the presentation identifier may be displayed on a video display or audibly output from a speaker of media presentation system 130. The participant may then enter the presentation identifier as input to participant client application 115, for example, by entering the characters of the presentation identifier using a hard-keyboard or soft-keyboard associated with client device 110. Alternatively, participant client application 115 can detect the presentation identifier as presented by media presentation system 130. For example, an image sensor of the participant's client device 110 can capture an image of a QR code visually presented by presentation client application 135 at media presentation system 130. The QR code can encode the presentation identifier.

After a participant has joined a media presentation by sending a join network request (step 402), the participant can send one or more presentation command network requests from their client device 110 as represented by step 404 in FIG. 4. The participant can send a variety of different presentation commands including a media selection command.

A media selection command is made to specify to presentation server module 125 how digital media item selections are to be made among the digital media items 145 associated with the account of the participant making the request. In some embodiments, a media selection command specifies either (a) a particular digital media item 145 associated with the participant's account that the participant wants to include in or exclude from the media presentation, or (b) that presentation server module 125 should automatically select digital media items 145 associated with the participant's account for inclusion in the media presentation. Both types of media selection commands can be made by the same participant during the same media presentation. For example, a participant make select one or more particular digital media items 145 to be included in or excluded from the media presentation and then select an automatic media selection feature to have presentation server module 125 select other digital media items for inclusion in the media presentation. When making the automatic selections, the presentation server module 125 may honor any digital media items 145 that the participant selected to be excluded from the media presentation by not selecting the excluded digital media items 145 for inclusion in the media presentation.

Media selection commands may be made by the participant through a user interface presented at the participant's client device 110. For example, the user interface may allow the participant to browse the digital media items 145 associated with the participant's account. As the participant is browsing, the participant can select individual digital media items 145 or groups of digital media items 145 to include in or exclude from the media presentation. For example, the browsing user interface may present selectable thumbnail images, icons, or other user interface elements that the participant can interact with, for example, by clicking or double clicking on with a mouse or other pointing device or with a touch-gesture as appropriate. User interface selections result in participant client application 115 sending network requests over network connection 152 containing media selection commands reflecting the user interface selections.

Exemplary Presentation Server Module Process

Figure 5:
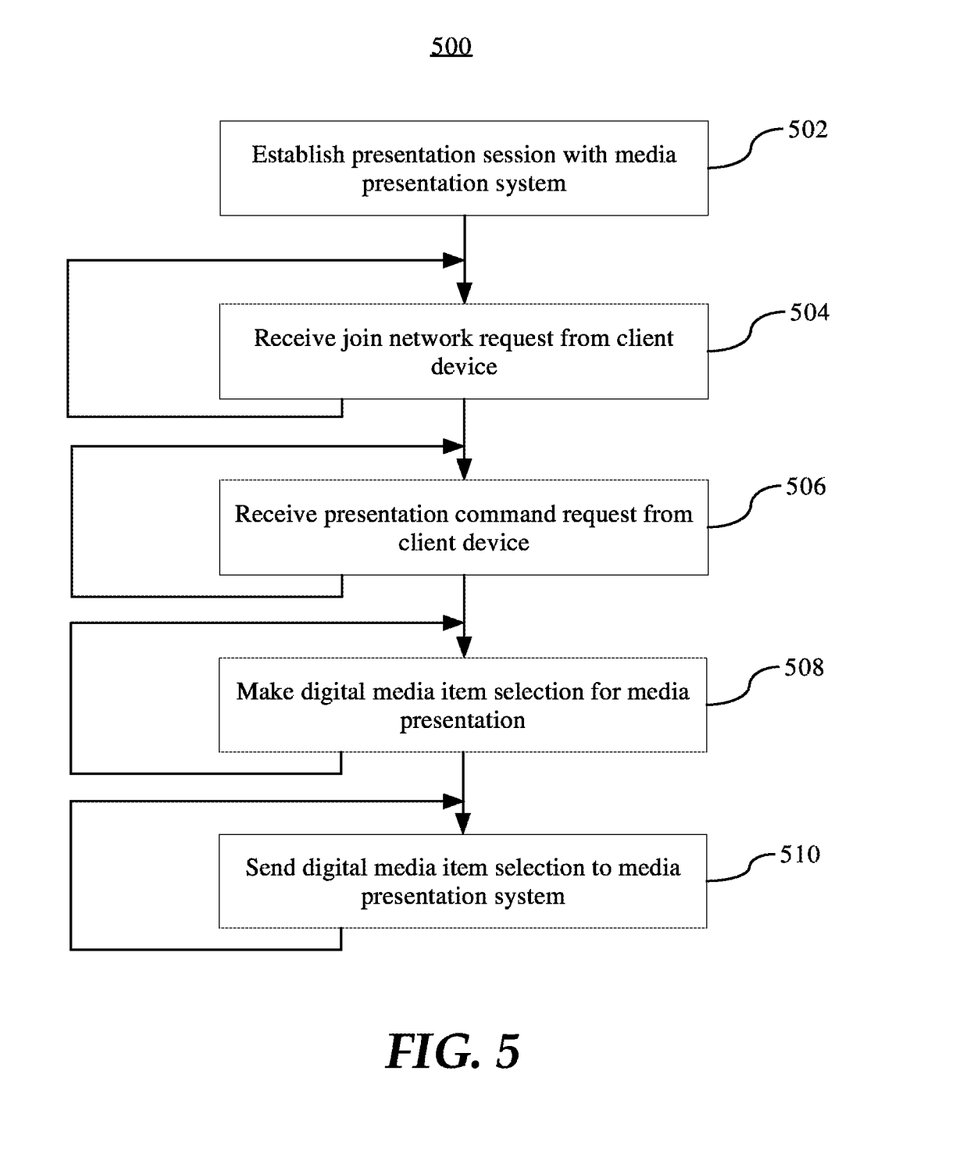
FIG. 5 is flowchart of an exemplary process performed by a presentation server module for group participation in a digital media presentation according to an embodiment of the present invention.

FIG. 5 is a flowchart illustrating a process 500 for group participation in a media presentation performed by presentation server module 125 of server 102, according to an embodiment of the present invention. While the steps of process 500 are illustrated in FIG. 5 in a certain order, some steps are performed in a different order, some steps are performed concurrently, some steps are omitted, and/or some steps are combined in other embodiments. In some embodiments, some steps are preformed multiple times during the course of a presentation. For example, steps 504, 506, 508, and 510 may be performed multiples times during a presentation.

At step 502, presentation server module 125 establishes a presentation session with a media presentation system 130. Such establishment may involve establishing network connection 154 between server 102 and media presentation server 130. Such establishment may also include assignment of a presentation identifier to the presentation.

At step 504, presentation server module 125 receives a network request from a participant's client device 110 to join a presentation. The network request may include the presentation identifier of the presentation the participant wishes to join. Upon receiving the join network request, present server module 125 may create metadata associating an account record 202 of the participant with the presentation identifier, for example, in account database 127 or other computer memory.

At step 506, presentation server module 125 receives a network request from a participant's client device 110 including a presentation command. The presentation command can specify a particular digital media item 145 associated with the participant's account record 202 through a digital media item record 204. The command may be to include the particular digital media item 145 in the presentation or to exclude the particular digital media item 145 from the presentation. Alternatively, instead of specifying a particular digital media item 145 to include or exclude, the presentation command can request the presentation server module 125 to automatically select digital media items 145 associated with the participant's account record 202 through digital media item records 204 for inclusion in a group media presentation. The group media presentation may be identified in the request by its presentation identifier.

At step 508, in response to receiving the network request at step 506, presentation server module 125 makes a selection of a digital media item 145 associated with the account of the participant that made the request at step 506. Step 508 may be performed multiple times in response to receiving the network request at step 506. For example, step 508 may be performed multiple times if presentation server module 125 is making automatic digital media item selections or if the network request at step 506 specifies multiple digital media items 145 selected by the participant.

If the request at step 506 explicitly specifies digital media items 145 to be included in the digital media presentation, then presentation server module 125 reads network location information for the specified digital media items 145 from the corresponding digital media item records 204 in account database 127. This network location information will be sent to media presentation system 130.

If presentation server module 125 is requested to make automatic digital media selections by the request received at step 506, then presentation server module 125 processes the digital media item records 204 and associated inferential selection metadata 206 associated with the participant's account record 202. In particular, presentation server module 125 applies an inferential selection algorithm in an attempt to infer which of the digital media items 145 associated with the participant account the participant would select for inclusion in the media presentation. Generally, the inferential selection algorithm involves assigning an inclusion score to each digital media item based on a number of inferential selection factors (which can be weighted) and then selecting some number of the highest scoring digital media items for inclusion in the digital media presentation. The inferential selection factors can be based on a variety of available inferential selection metadata 206 including, but not limited to, some or all of the following:

- Numerosity of access/views—For example, digital media items that have the most number of accesses or views may be selected. The selection may be restricted to the most number of access or views by a particular participant (e.g., the participant for which the selection is being made) or the most number of access or views by all participants to the media presentation.
- Privacy or access controls—For example, digital media items marked as private or other access controls that indicate or mandate that the digital media items should not be included in the media presentation may not be selected.
- Content—For example, digital media items known to feature a participant or multiple participants may be selected. For example, a photo known to be a picture of a participant or multiple participants may be selected.
- Temporal—For example, the most recently created digital media items may be selected.

After a digital media item is selected at step 508, location information for the selected digital media item is sent to media presentation system 130 over network connection 154. The location information is information presentation client application 135 can use to download the selected digital media item from content item repository 140. In addition to location information, presentation server module 125 may also send presentation metadata for the selected digital media item such as presentation ordering information, presentation length information, and/or presentation transitioning information. For example, the presentation ordering information may specify that the selected digital media item is to be presented next in order after all previously selected digital media items have been presented. This may also be implied by the order in which location information for selected digital media items is sent to media presentation system 130 over network connection 154. The presentation length information may specify how long the selected digital media item is to be presented. For example, if the digital media item is a photo, then presentation length information may specify how long the photo is to be presented on the video display at media presentation system 130. As another example, if the digital media item is a video, the presentation length information may specify a start time indicating a point in time during the duration of the video that presentation of the video is to begin and also specify an end time or a presentation time length that indicates for how long from the start point the video is to be presented. Presentation transitioning information may specify how presentation client application 135 is to transition the presentation of previously presented digital media item to the selected digital media item, for example, according to one or more of the transition effects discussed above.

Example Implementing Mechanism

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
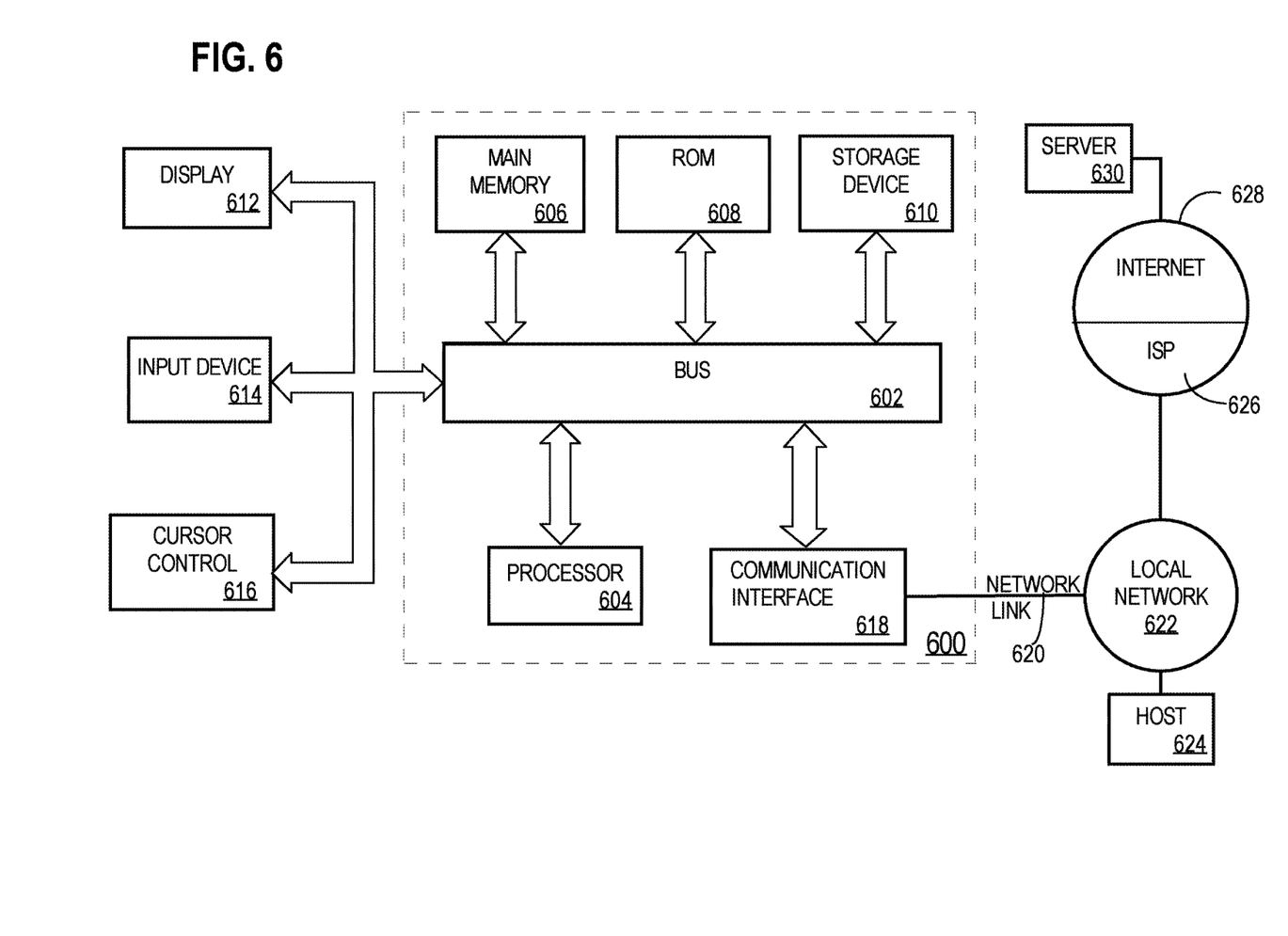
FIG. 6 is a block diagram illustrating a computer system on which embodiments of the invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic, or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic, or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620, and communication interface 618. In the Internet example, a server 630 might transmit a requested code for an application program through Internet 628, ISP 626, local network 622, and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   at a media presentation system that includes or is coupled to electronic components for presenting digital media, the media presentation system comprising one or more processors, memory, and one or more programs stored in the memory and executed by the one or more processors to perform the method, performing operations comprising:
   establishing a media presentation session with a media presentation server over a network, the media presentation session established for a digital media presentation to be presented at the media presentation system;
   receiving, from the media presentation server over a network, one or more first links to one or more first digital media items to be presented in the digital media presentation;
   using the one or more first links to download the one or more first digital media items from one or more content item repositories over a network;
   presenting the one or more first digital media items as part of the digital media presentation via the electronic components for presenting digital media;
   receiving, during the digital media presentation, from the media presentation server over a network, one or more second links to one or more second digital media items to be presented in the digital media presentation;
   using the one or more second links to download, during the digital media presentation, the one or more second digital media items from one or more content item repositories over a network;
   automatically presenting, during the digital media presentation, the one or more second digital media items as part of the digital media presentation via the electronic components for presenting digital media; and
   wherein at least the operations of receiving the one or more first links and receiving the one or more second links are performed while the media presentation session is established and during the digital media presentation.

2. The method of claim 1, wherein the one or more first digital media items are associated with an account of a first user, and the one or more second digital media items are associated with an account of a second user, different from the first user.

3. The method of claim 1, wherein at least one of the one or more second digital media items is related to at least one of the one or more first digital media items based on one or more access descriptors for the one or more second digital media items and based on one or more access descriptors for the one or more first digital media items.

4. The method of claim 1, wherein at least one of the one or more second digital media items is related to at least one of the one or more first digital media items based on one or more privacy descriptors for the one or more second digital media items and based on one or more privacy descriptors for the one or more first digital media items.

5. The method of claim 1, further comprising:
presenting an identifier of the media presentation session at the media presentation system;
receiving the identifier of the media presentation session in a request from a personal computing device of a first user to join the media presentation session;
wherein the one or more first digital media items are associated with a user account held by the first user;
receiving the identifier of the media presentation session in a request from a personal computing device of a second user to join the media presentation session; and
wherein the one or more second digital media items are associated with a user account held by the second user.

6. The method of claim 1, further comprising:
receiving an identifier of the digital media presentation with the receiving of the one or more first links;
based on the identifier, selecting the digital media presentation to present the one or more first digital media items linked to by the one or more first links;
receiving the identifier of the digital media presentation with the receiving the one or more second links; and
based on the identifier, selecting the digital media presentation to present the one or more second digital media items linked to by the one or more second links.

7. The method of claim 1, further comprising:
receiving presentation control information from the media presentation server;
displaying the digital media presentation according to the presentation control information; and
wherein the presentation control information includes one or more: digital media item ordering information, digital media item presentation timing information, or transition effects that the presentation media system is to apply and present for aesthetic transitioning between presentation of successive digital media items.

8. The method of claim 1, further comprising, while the media presentation session is established, sending capabilities and characteristics of the media presentation system to the media presentation server, the capabilities and characteristics indicating one or more of: screen size of the media presentation system, screen resolution of the media presentation system, or available media decoders of the media presentation system.

9. The method of claim 1, wherein each of the one or more first links and each of the one or more second links is a Uniform Resource Locator (URL).

10. The method of claim 1, wherein the media presentation system is a smart television device.

11. A system for group participation in a digital media presentation, the system comprising:

a media presentation system that includes or is coupled to electronic components for presenting digital media, the media presentation system comprising one or more processors, memory, and one or more programs stored in the memory and executed by the one or more processors, the media presentation system configured to:
establishing a media presentation session with a media presentation server over a network, the media presentation session established for a digital media presentation to be presented at the media presentation system;
receiving, from the media presentation server over a network, one or more first links to one or more first digital media items to be presented in the digital media presentation;
using the one or more first links to download the one or more first digital media items from one or more content item repositories over a network;
presenting the one or more first digital media items as part of the digital media presentation via the electronic components for presenting digital media;
receiving, during the digital media presentation, from the media presentation server over a network, one or more second links to one or more second digital media items to be presented in the digital media presentation;
using the one or more second links to download, during the digital media presentation, the one or more second digital media items from one or more content item repositories over a network;
automatically presenting, during the digital media presentation, the one or more second digital media items as part of the digital media presentation via the electronic components for presenting digital media; and
wherein at least the receiving the one or more first links and receiving the one or more second links are configured to be performed while the media presentation session is established and during the digital media presentation.

12. The system of claim 11, wherein the one or more first digital media items are associated with an account of a first user, and the one or more second digital media items are associated with an account of a second user, different from the first user.

13. The system of claim 11, wherein at least one of the one or more second digital media items is related to at least one of the one or more first digital media items based on one or more access descriptors for the one or more second digital media items and based on one or more access descriptors for the one or more first digital media items.

14. The system of claim 11, wherein at least one of the one or more second digital media items is related to at least one of the one or more first digital media items based on one or more privacy descriptors for the one or more second digital media items and based on one or more privacy descriptors for the one or more first digital media items.

15. The system of claim 11, further configured:
presenting an identifier of the media presentation session at the media presentation system;
receiving the identifier of the media presentation session in a request from a personal computing device of a first user to join the media presentation session;
wherein the one or more first digital media items are associated with a user account held by the first user;
receiving the identifier of the media presentation session in a request from a personal computing device of a second user to join the media presentation session; and wherein the one or more second digital media items are associated with a user account held by the second user.

16. The system of claim 11, further configured:
receiving an identifier of the digital media presentation with the receiving of the one or more first links;
based on the identifier, selecting the digital media presentation to present the one or more first digital media items linked to by the one or more first links;
receiving the identifier of the digital media presentation with the receiving the one or more second links;
based on the identifier, selecting the digital media presentation to present the one or more second digital media items linked to by the one or more second links.

17. The system of claim 11, further configured:
receiving presentation control information from the media presentation server;
displaying the digital media presentation according to the presentation control information;
wherein the presentation control information includes one or more: digital media item ordering information, digital media item presentation timing information, or transition effects that the presentation media system is to apply and present for aesthetic transitioning between presentation of successive digital media items.

18. The system of claim 11, further configured, while the media presentation session is established, sending capabilities and characteristics of the media presentation system to the media presentation server, the capabilities and characteristics indicating one or more of: screen size of the media presentation system, screen resolution of the media presentation system, or available media decoders of the media presentation system.

19. The system of claim 11, wherein each of the one or more first links and each of the one or more second links is a Uniform Resource Locator (URL).

20. The system of claim 11, wherein the media presentation system is a smart television device.

* * * * *